(12) United States Patent
Hsu

(10) Patent No.: US 7,903,076 B2
(45) Date of Patent: Mar. 8, 2011

(54) GATE DRIVING CIRCUIT OF LIQUID CRYSTAL DISPLAY

(75) Inventor: Sheng-Kai Hsu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 812 days.

(21) Appl. No.: 11/674,691

(22) Filed: Feb. 14, 2007

(65) Prior Publication Data

US 2008/0111801 A1  May 15, 2008

(30) Foreign Application Priority Data

Nov. 9, 2006   (TW) ............................... 95141587 A (51) Int. Cl.
 *G09G 3/36* (2006.01)
(52) U.S. Cl. .......................................... 345/100; 377/78
(58) Field of Classification Search .................. 345/204, 345/100, 99; 377/77, 78, 70
 See application file for complete search history.

(56) References Cited

U.S. PATENT DOCUMENTS

| | | | | |
|---|---|---|---|---|
| 5,136,622 | A * | 8/1992 | Plus | 377/64 |
| 6,414,670 | B1 * | 7/2002 | Kim | 345/98 |
| 6,690,347 | B2 | 2/2004 | Jeon et al. | |
| 2005/0057483 | A1 | 3/2005 | Sekido et al. | |
| 2005/0083292 | A1 * | 4/2005 | Moon et al. | 345/100 |
| 2007/0018940 | A1 * | 1/2007 | Park | 345/100 |

* cited by examiner

Primary Examiner — Chanh Nguyen
Assistant Examiner — Tsegaye Seyoum
(74) Attorney, Agent, or Firm — Thomas, Kayden, Horstemeyer & Risley, LLP (57) ABSTRACT

A gate driving circuit includes several driving circuit units and several switch units. Each driving circuit unit outputs several driving signals to several scan lines sequentially. One of the switch units is respectively disposed between two adjacent driving circuit units and conducts or blocks a first and a second clock signal transmitted to driving circuit units.

22 Claims, 11 Drawing Sheets

GATE DRIVING CIRCUIT OF LIQUID CRYSTAL DISPLAY

RELATED APPLICATIONS

The present application is based on, and claims priority from, Taiwan Patent Application Serial Number 95141587, filed Nov. 9, 2006, the disclosure of which is hereby incorporated by reference herein in its entirety.

BACKGROUND

1. Field of Invention

The present invention relates to a gate driving circuit. More particularly, the present invention relates to a gate driving circuit of a liquid crystal display.

2. Description of Related Art

Figure 1:
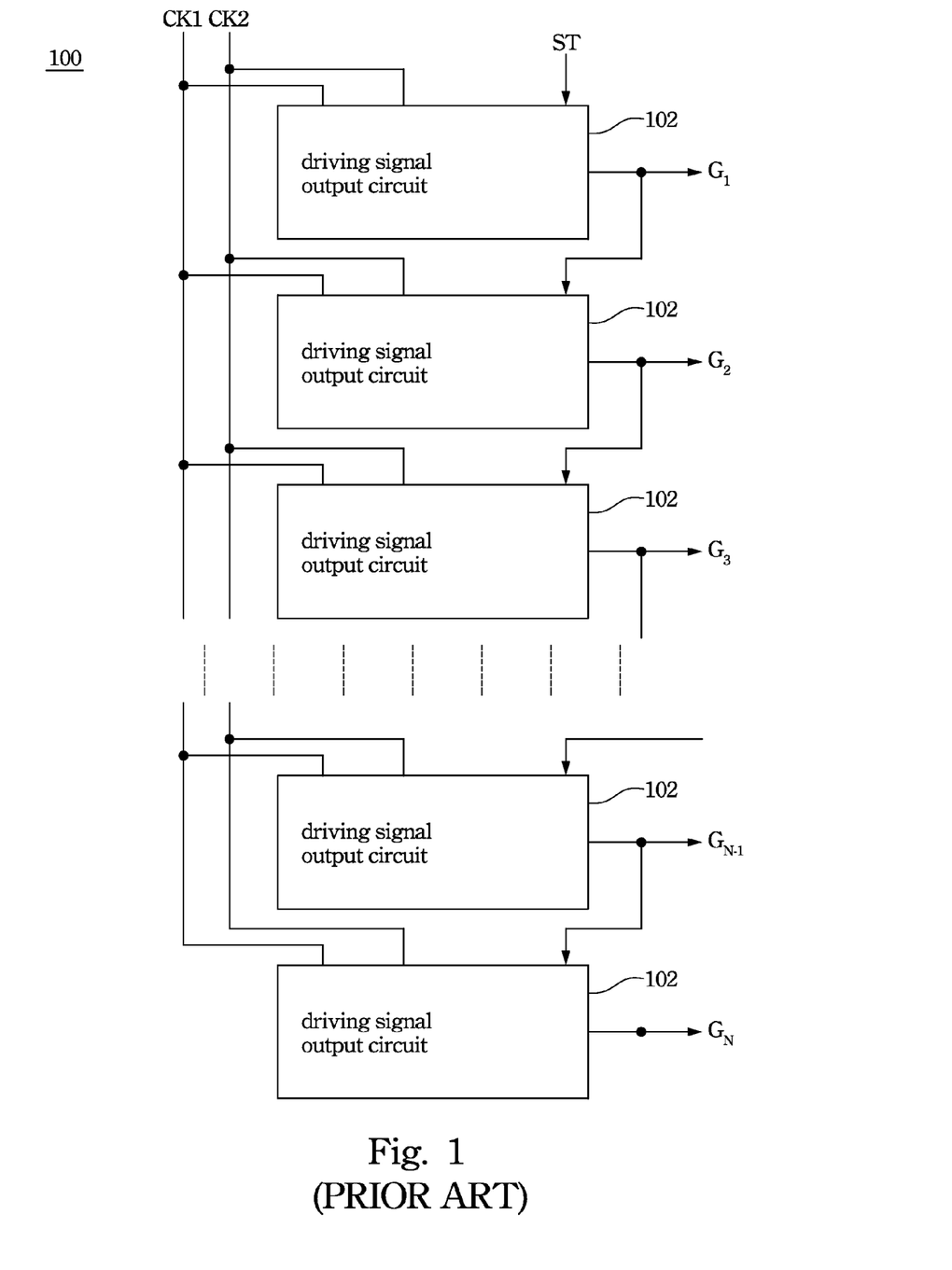
FIG. 1 shows a gate driving circuit of the conventional liquid crystal display.

In a conventional liquid crystal display, the driving circuit development is usually one of the key technologies and also the most important factor for the quality and the production cost of the liquid crystal display. FIG. 1 shows a gate driving circuit of the conventional liquid crystal display. The gate driving circuit 100 includes driving signal output circuits 102. Each of the driving signal output circuits 102 is controlled by clock signals CK1 and CK2 with opposite phases, and outputs a driving signal to a corresponding scan line.

In the gate driving circuit 100, the driving signal outputted from the previous driving signal output circuit 102 is transmitted to the next driving signal output circuit 102, so as to trigger the next driving signal output circuit 102 to output the driving signal. However, the clock signals CK1 and CK2 are continuously transmitted to each of the driving signal output circuits 102 during the operation of the gate driving circuit 100, so that the driving signal output circuits 102, disposed at the latter part of the gate driving circuit 100 and not being driven yet, also receives the clock signals CK1 and CK2 and causes unnecessary losses.

For the foregoing reasons, there is a need for a gate driving circuit capable of reducing the circuit losses.

SUMMARY

In accordance with one embodiment of the present invention, a gate driving circuit is provided. The gate driving circuit includes driving circuit units and switch units. Each of the driving circuit units sequentially outputs driving signals to scan lines. Each of the switch units is disposed between two adjacent driving circuit units and conducts or blocks a first clock signal and a second clock signal transmitted to the driving circuit units. Each of the switch units is turned on by receiving one of the driving signals outputted from a previous driving circuit unit, so as to allow a next driving circuit unit to receive the first clock signal and the second clock signal.

In accordance with another embodiment of the present invention, a gate driving circuit of a liquid crystal display is provided. The gate driving circuit includes driving circuit units, a timing controller, a clock signal generator and switch units. Each of the driving circuit units sequentially outputs one of driving signals to a corresponding scan line of the liquid crystal display. The timing controller generates a reference clock signal. The clock signal generator receives the reference clock signal and outputs a first clock signal and a second clock signal to the driving circuit units according to the reference clock signal. Further, each of the switch units is disposed between two adjacent driving circuit units for conducting or blocking the first clock signal and the second clock signal outputted from the clock signal generator.

In accordance with yet another embodiment of the present invention, a gate driving circuit is provided. The gate driving circuit includes driving circuit units and a clock signal output unit. Each of the driving circuit units sequentially outputs driving signals and the driving signals are sequentially transmitted to corresponding scan lines. The clock signal output unit transmits clock signals respectively to one of the driving circuit units to sequentially control the driving circuit units. The clock signal output unit transmits only one of the clock signals to one of the driving circuit units at a time.

In accordance with yet another embodiment of the present invention, a switch unit is provided. The switch unit includes a switch and a flip-flop circuit. The switch conducts or blocks a transmission signal. The flip-flop circuit is controlled with a bias and electrically couples to the switch, and receives a trigger signal to turn on the switch to conduct the transmission signal or receives a stop signal to turn off the switch to block the transmission signal. The flip-flop circuit includes an input unit, an assistant output unit and an output unit. The input unit couples to the bias and receives the trigger signal or the stop signal to output a first signal. The assistant output unit couples to the bias and the input unit and receives the first signal to output a second signal. The output unit couples to the bias, the assistant output unit and the switch and receives the second signal to output a third signal to control the switch.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Detailed illustrative embodiments of the present invention are disclosed herein. However, specific details disclosed herein are merely representative for purposes of describing exemplary embodiments of the present invention. This invention may, however, be embodied in many alternate forms and should not be construed as limited to the embodiments set forth herein.

Figure 2:
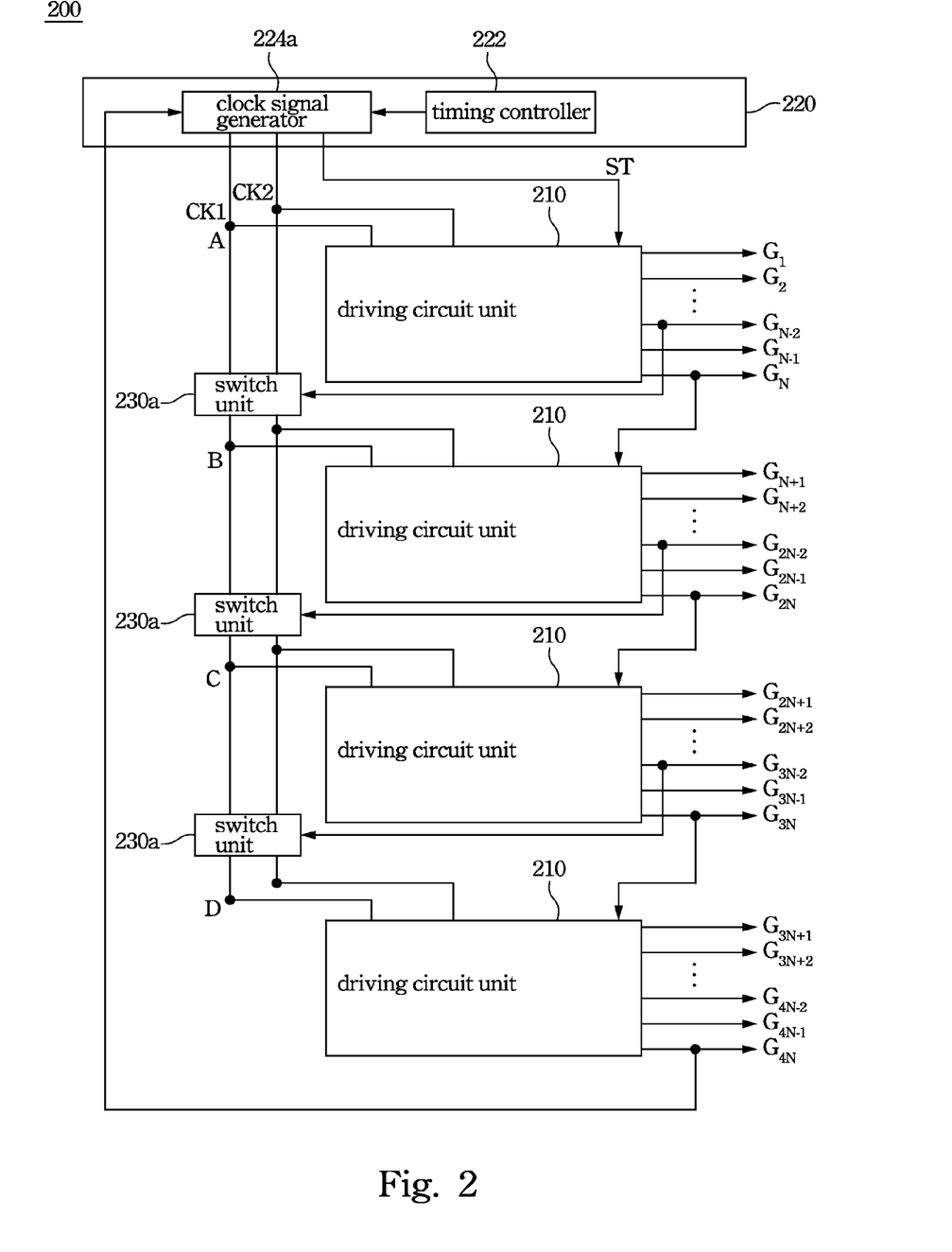
FIG. 2 shows a gate driving circuit according to the first embodiment of the present invention.

FIG. 2 shows a gate driving circuit according to the first embodiment of the present invention. The gate driving circuit 200 includes driving circuit units 210 and switch units 230a. Four driving circuit units 210 are taken for example herein in order to be easily described, and each of the driving circuit units 210 is assumed to output N driving signals.

In the gate driving circuit 200, each of the driving circuit unit 210 includes N driving signal output circuits (not shown) for sequentially outputting N driving signals to N scan lines. The switch units 230a are respectively disposed between two adjacent driving circuit units 210 and conduct or block a first clock signal CK1 and a second clock signal CK2 transmitted to the driving circuit units 210. Each of the switch units 230a is turned on by receiving one of the driving signals outputted from the previous driving circuit unit 210, so as to allow the next driving circuit unit 210 to receive the first clock signal and the second clock signal.

Besides, the gate driving circuit 200 can further include a clock signal output unit 220 to transmit the clock signals CK1 and CK2 to the driving circuit units 210, and the clock signal output unit 220 can further include a timing controller 222 and a clock signal generator 224a. The timing controller 222 generates a reference clock signal. The clock signal generator 224a receives the reference clock signal and generates the clock signals CK1 and CK2 according to the reference clock signal.

Furthermore, a gate driving circuit of a liquid crystal display is provided according to another embodiment of the present invention. The gate driving circuit includes driving circuit units 210, a timing controller 222, a clock signal generator 224a and switch units 230a. Each of the driving circuit units 210 includes driving signal output circuits (not shown) which sequentially output one of driving signals to a corresponding scan line of the liquid crystal display. The timing controller 222 generates a reference clock signal. The clock signal generator 224a receives the reference clock signal and outputs the first clock signal CK1 and the second clock signal CK2 to the driving circuit units 210 according to the reference clock signal. The timing controller 222 and the clock signal generator 224a can be disposed on a print circuit board assembly or a substrate. Besides, the switch units 230a are respectively disposed between two adjacent driving circuit units 210 to conduct or block the clock signals CK1 and CK2 outputted from the clock signal generator 224a.

An operation of the gate driving circuit 200 is described as following with an embodiment. First of all, the clock signals CK1 and CK2 control the first driving circuit unit 210. Then, when the clock signal generator 224a transmits a start signal ST to the first driving circuit unit 210, the first driving circuit unit 210 is triggered and sequentially outputs the driving signals $G_1 \ldots G_N$ to the scan lines, and transmits the last driving signal $G_N$ to the second driving circuit unit 210, so as to trigger the second driving circuit unit 210.

Therefore, the switch unit 230a, disposed between the first and the second driving circuit units 210, is turned on because the switch unit 230a receives one of the driving signals outputted from the first driving circuit unit 210, such as $G_{N-2}$, so that the second driving circuit unit 210 can receive the clock signals CK1 and CK2. Then, after the second driving circuit unit 210 is triggered by the driving signal $G_N$, the second driving circuit unit 210 sequentially outputs the driving signals $G_{N+1} \ldots G_{2N}$ to the scan lines and transmits the last driving signal $G_{2N}$ to the third driving circuit unit 210, so as to trigger the third driving circuit unit 210. The third and the fourth driving circuit units 210 then sequentially output the driving signals $G_{2N+1} \ldots G_{3N}$ and the driving signals $G_{3N+1} \ldots G_{4N}$, respectively, in the same way.

After the last driving circuit unit 210 outputs the last driving signal $G_{4N}$, the last driving circuit unit 210 transmits the driving signal $G_{4N}$ back to the clock signal generator 224a, so as to stop the clock signal generator 224a transmitting the clock signals CK1 and CK2, and the clock signals CK1 and CK2 are outputted from the clock signal generator 224a again until the next operation.

Figure 3:
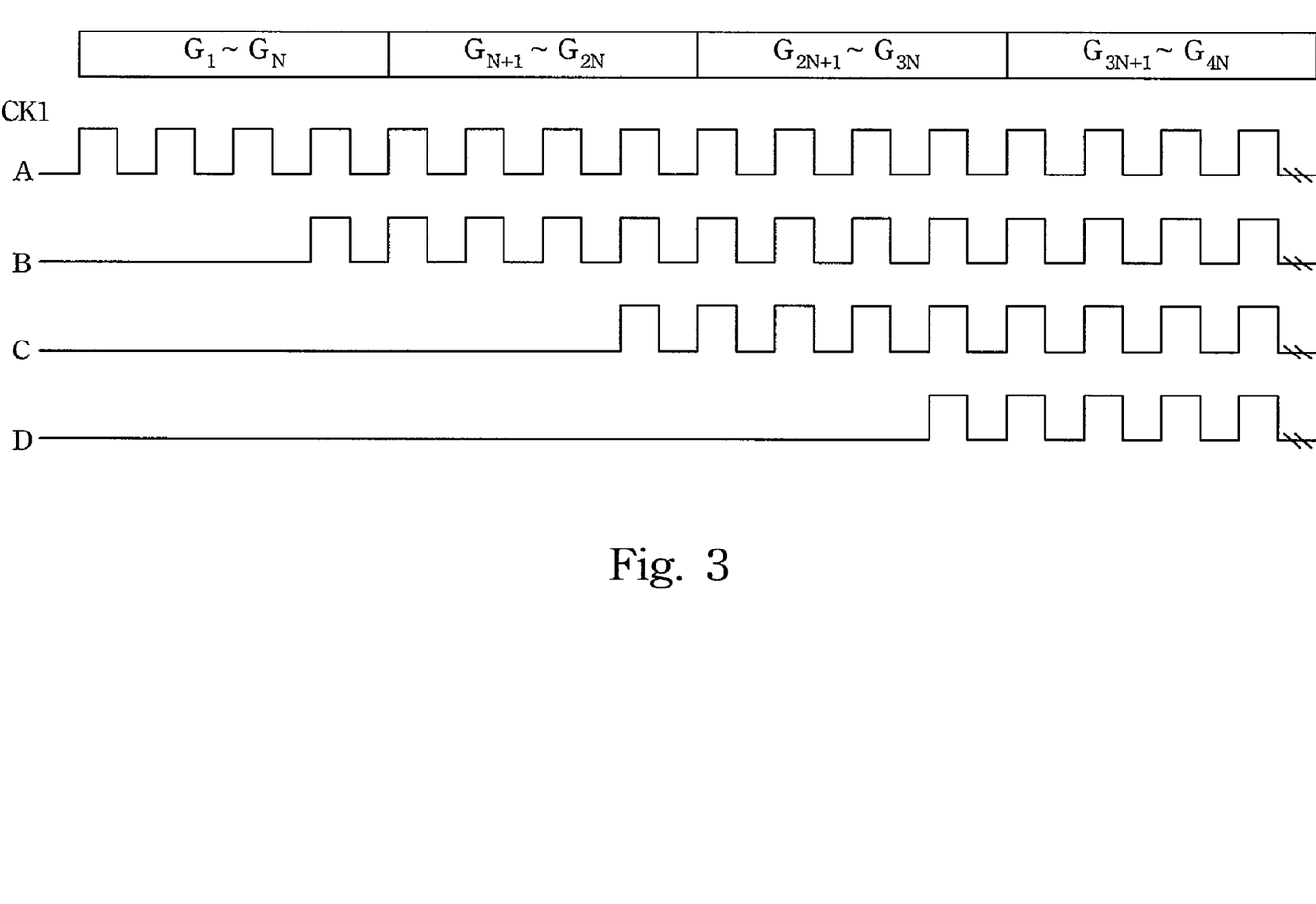
FIG. 3 is a clock diagram showing the transmission condition of the clock signals.

FIG. 3 is a clock diagram showing the transmission condition of the clock signals. Referring to FIG. 2 and FIG. 3 and taking the transmission condition of the first clock signal CK1 for example, at first, the clock signal generator 224a transmits the first clock signal CK1 to the first driving circuit unit 210. Therefore, the first switch unit 230a is still turned off, so the first clock signal CK1 only passes node A and does not pass nodes B, C and D. Then, after the first switch unit 230a is turned on because of receiving one of the driving signals outputted from the first driving circuit unit 210, such as $G_{N-2}$, the first clock signal CK1 passes the nodes A and B; that is, the first clock signal CK1 is transmitted to the second driving circuit unit 210 through the first switch unit 230a. Therefore, the second switch unit 230a is still turned off, so the first clock signal CK1 does not pass the nodes C and D. Each of the switch units 230a is sequentially conducted as mentioned to pass on the first clock signal CK1 to the latter driving circuit units 210.

Figure 4:
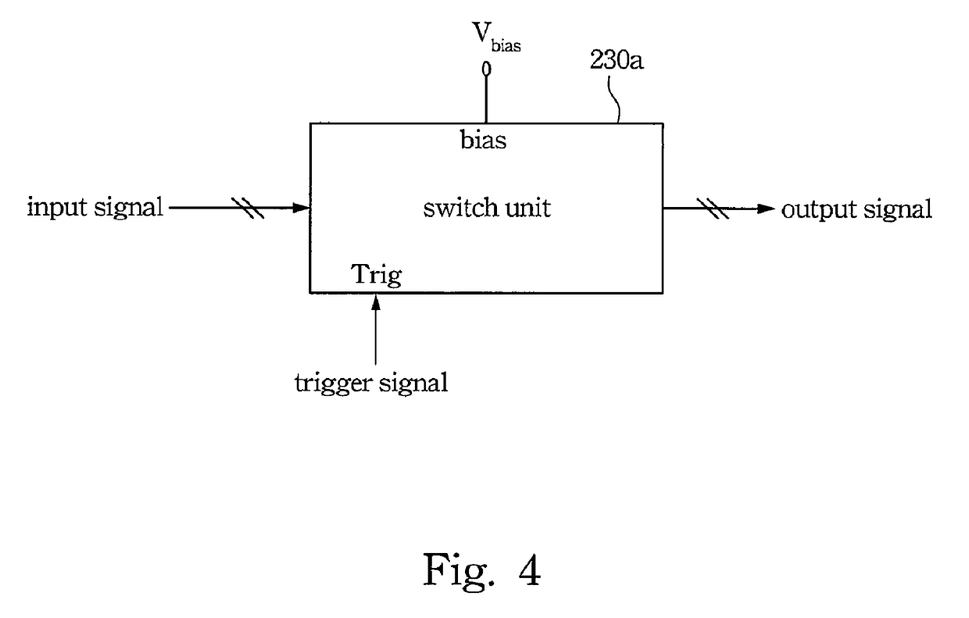
FIG. 4 shows the switch unit in FIG. 2.

FIG. 4 shows the switch unit in FIG. 2. The switch unit 230a is controlled with the bias $V_{bias}$ and receives a trigger signal to turn on, so that the input signal can be transmitted through the switch unit 230a. In this embodiment, the trigger signal is one of the driving signals outputted from the previous driving circuit unit 210, and the input and output signals are clock signals CK1 and CK2, respectively.

Figure 5:
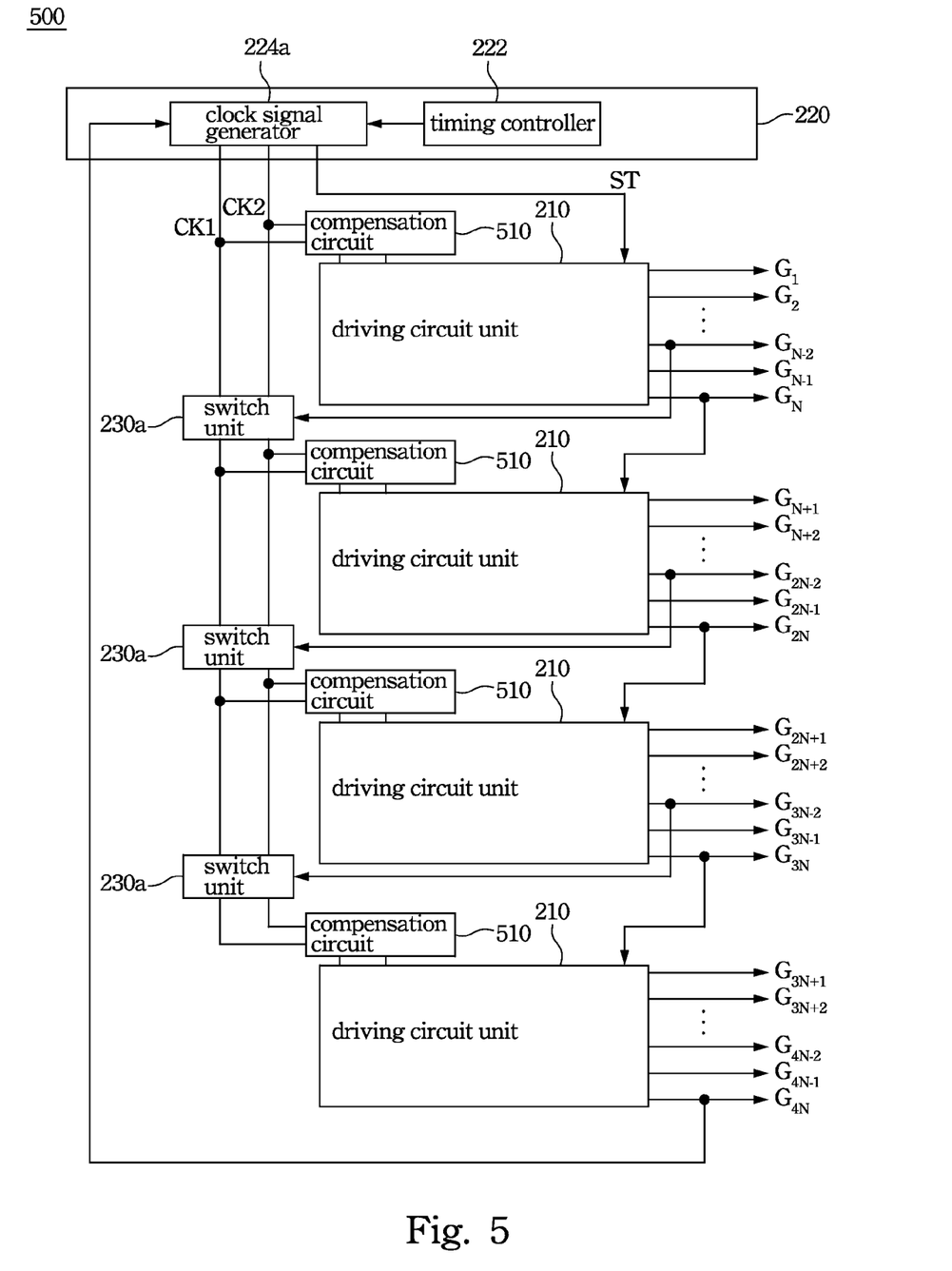
FIG. 5 shows a gate driving circuit according to the second embodiment of the present invention.

FIG. 5 shows a gate driving circuit according to the second embodiment of the present invention. Comparing FIG. 5 and FIG. 2, the gate driving circuit 500 further includes compensation circuits 510. Each of the compensation circuits 510 is disposed before one of the driving circuit units 210 for compensating the clock signals CK1 and CK2, and transmits the compensated clock signals CK1 and CK2 to the corresponding driving circuit unit 210, so as to prevent the clock signals CK1 and CK2 from gradually decaying and not being transmitted normally when the clock signals CK1 and CK2 is transmitted to the latter part of the gate driving circuit 500.

Figure 6:
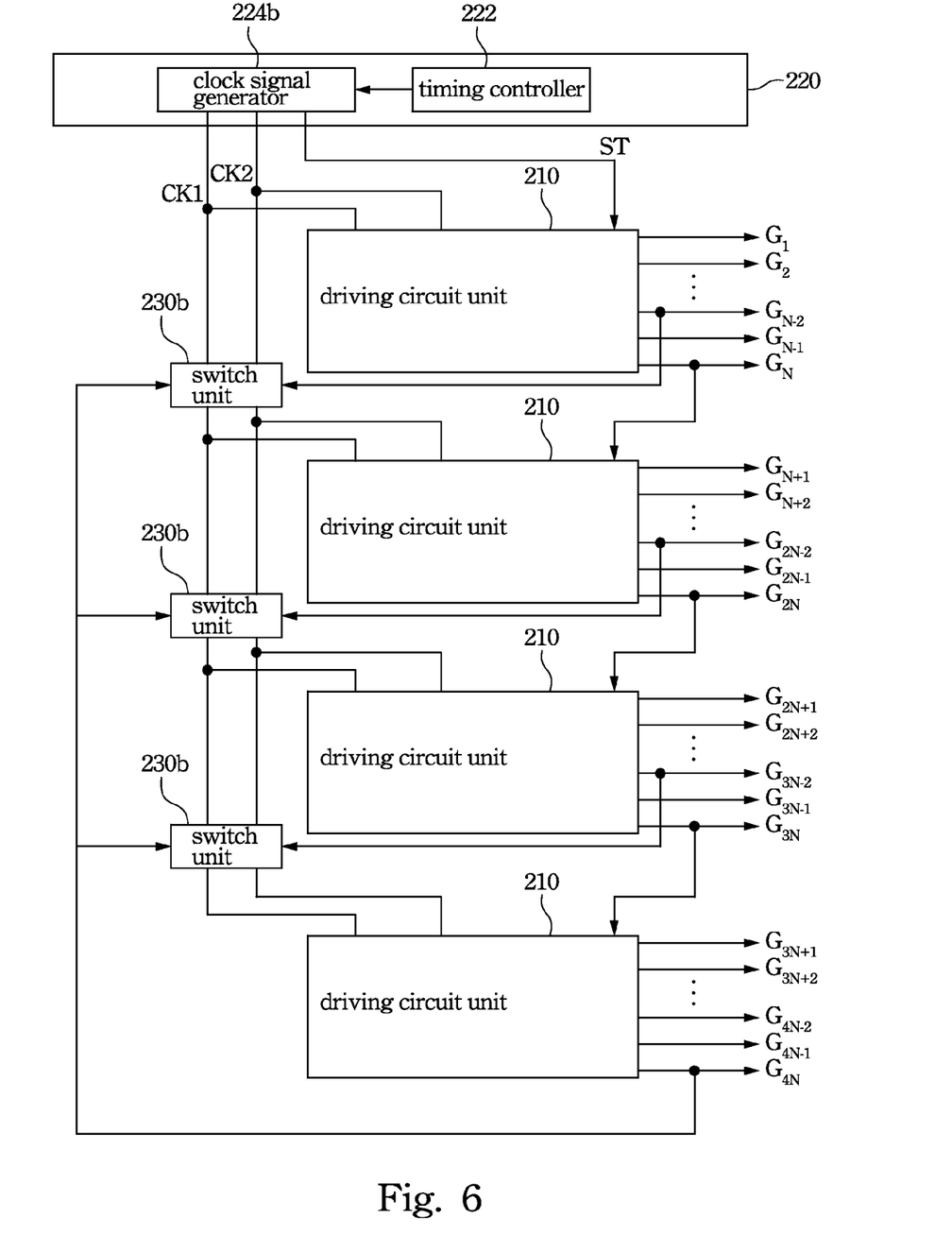
FIG. 6 shows a gate driving circuit according to the third embodiment of the present invention.

FIG. 6 shows a gate driving circuit according to the third embodiment of the present invention. Comparing FIG. 6 and FIG. 2, the last driving circuit unit 210 transmits the last driving signal $G_{4N}$ back to the switch units 230b, so that the switch units 230b are accordingly turned off to block the clock signals CK1 and CK2.

Figure 7A:
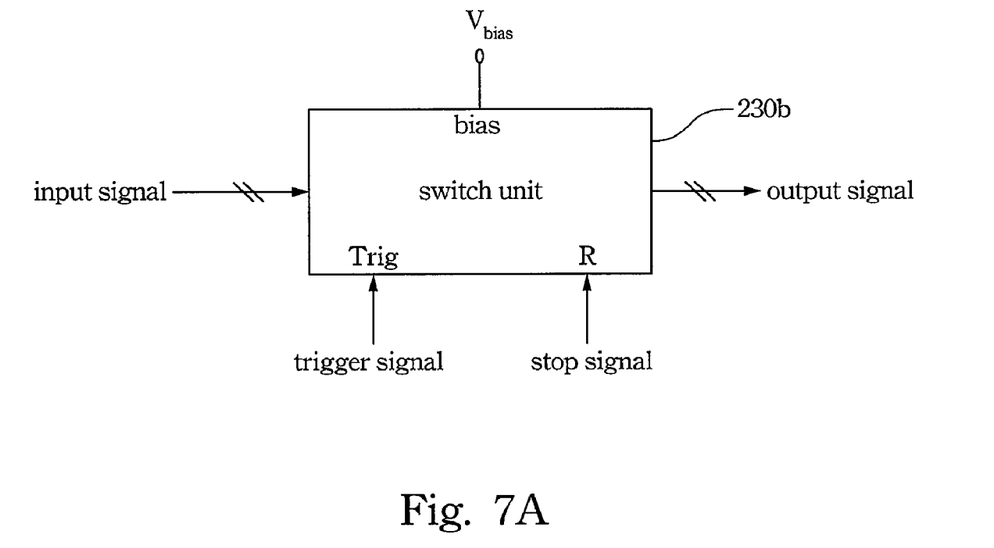
FIG. 7A shows the switch unit in FIG. 6.

FIG. 7A shows the switch unit in FIG. 6. Comparing the switch unit 230b and the switch unit 230a in FIG. 4, the switch unit 230b can further receive a stop signal, so that the switch unit 230b can be turned off to block the clock signals CK1 and CK2 because of receiving the stop signal.

Figure 7B:
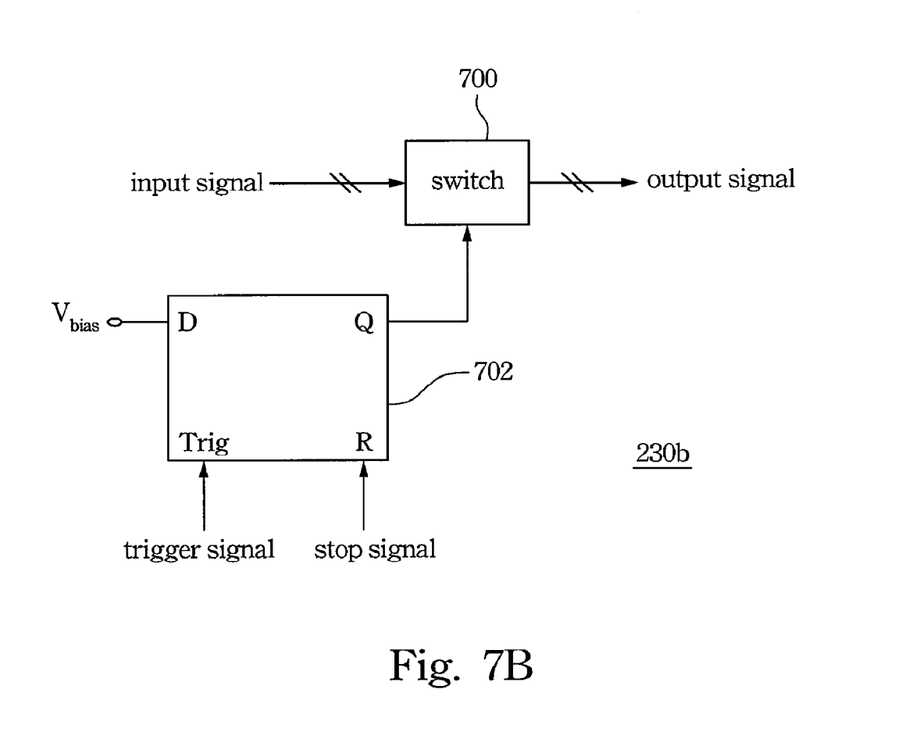
FIG. 7B shows the switch unit in FIG. 7A.

FIG. 7B shows the switch unit in FIG. 7A. The switch unit 230b includes a switch 700 and a flip-flop circuit 702. The switch 700 conducts or blocks the transmission signals, and the switch 700 can be a NAND gate or a transmission gate. The flip-flop circuit 702 is controlled with the bias $V_{bias}$ and electrically couples to the switch 700, and receives a trigger signal to turn on the switch 700 which conducts the transmission signals or receives a stop signal to turn off the switch 700 which blocks the transmission signals. In FIG. 7B, the trigger signal is one of the driving signals outputted from the previous driving circuit unit 210, and the stop signal is the last driving signal outputted from the last driving circuit unit 210, and the input and output signals are the clock signals CK1 and CK2, respectively.

Figure 8:
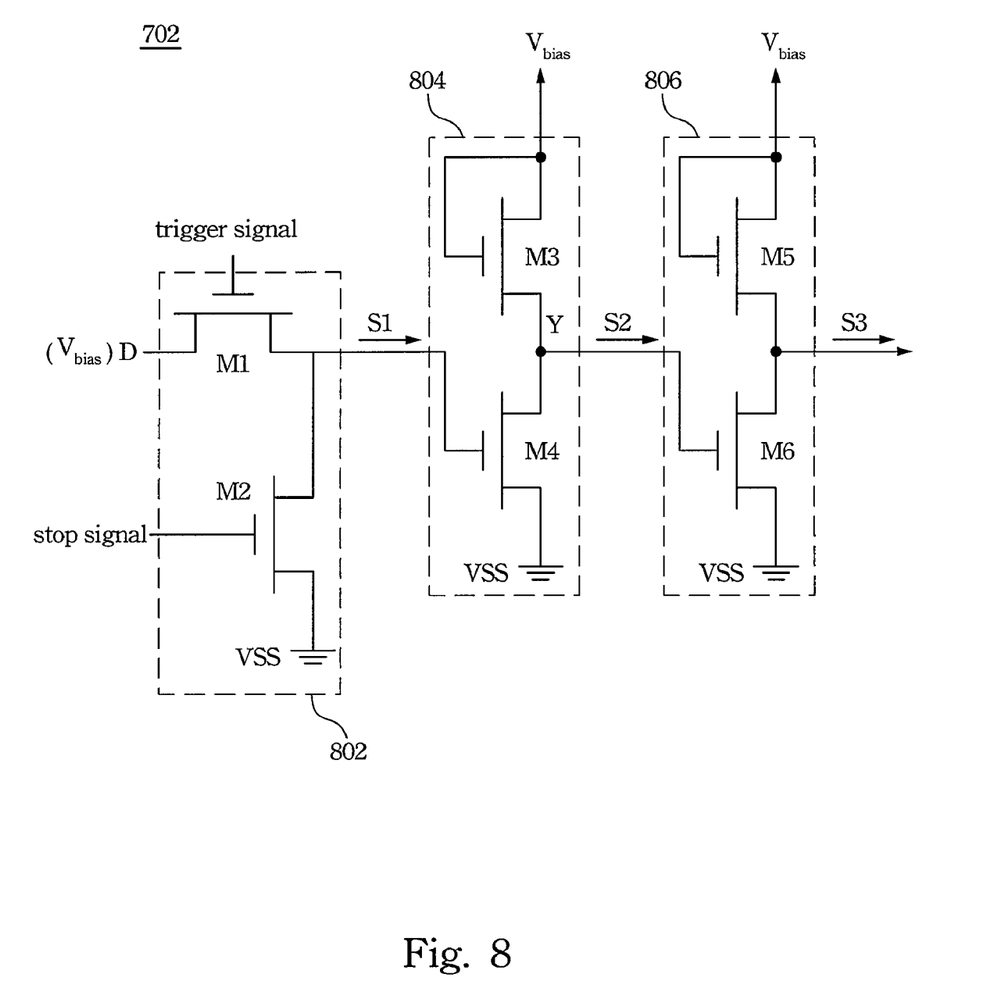
FIG. 8 shows the flip-flop circuit in FIG. 7B.

FIG. 8 shows the flip-flop circuit in FIG. 7B. The flip-flop circuit 702 includes an input unit 802, an assistant output unit 804 and an output unit 806. The input unit 802 couples to the bias $V_{bias}$ and receives the trigger signal or the stop signal to output a first signal S1. The assistant output unit 804 couples to the bias $V_{bias}$ and the input unit 802 and receives the first signal S1 to output a second signal S2. The output unit 806 couples to the bias $V_{bias}$, the assistant output unit 804 and the switch unit 700 and receives the second signal S2 to output a third signal S3 to control the switch unit 700.

The input unit 802 includes a transistor M1 and a transistor M2. The gate electrode of the transistor M1 receives the trigger signal, and the first source/drain electrode of the transistor M1 couples to the bias $V_{bias}$, and the second source/drain electrode of the transistor M1 outputs the first signal S1. Further, the gate electrode of the transistor M2 receives the stop signal, and the first source/drain electrode of the transistor M2 couples to the second source/drain electrode of the transistor M1 and outputs the first signal S1, and the second source/drain electrode of the transistor M2 couples to a power voltage VSS.

The assistant output unit 804 includes a transistor M3 and a transistor M4. The gate electrode and the first source/drain electrode of the transistor M3 couples to the bias $V_{bias}$, and the second source/drain electrode of the transistor M3 outputs the second signal S2. Further, the gate electrode of the transistor M4 receives the first signal S1, and the first source/drain electrode of the transistor M4 couples to the second source/drain electrode of the transistor M3 and outputs the second signal S2, and the second source/drain electrode of the transistor M4 couples to the power voltage VSS.

Besides, the output unit 806 includes a transistor M5 and a transistor M6. The gate electrode and the first source/drain electrode of the transistor M5 couples to the bias $V_{bias}$, and the second source/drain electrode of the transistor M5 outputs the third signal S3 to control the switch 700. Further, the gate electrode of the transistor M6 receives the second signal S2, and the first source/drain electrode of the transistor M6 outputs the third signal S3, and the second source/drain electrode of the transistor M6 couples to the power voltage VSS.

An operation of the flip-flop circuit 702 is described as following with an embodiment. When the flip-flop circuit 702 receives the trigger signal, the transistor M1 is turned on and the transistor M2 is turned off, so that the outputted first signal S1 is at the high-level state. At this time, the transistors M3 and M4 are both turned on, so that the outputted second signal S2 is at the low-level state. Then, the transistor M6 is turned off and the transistor M5 is turned on, so the outputted third signal S3 is at the high-level state and the switch 700 is accordingly turned on. After the flip-flop circuit 702 receives the trigger signal, the flip-flop circuit 702 receives no signals. The transistors M1 and M2 are therefore turned off and the second signal S2 is at the low-level state, so that the transistor M6 is turned off and the transistor M5 is turned on, and the third signal S3 is therefore at the high-level state. Then, when the flip-flop circuit 702 receives the stop signal, the transistor M2 is turned on and the transistor M1 is turned off, so that the first signal S1 is at the low-level state. Then, the transistor M3 is turned on and the transistor M4 is turned off, so that the second signal S2 is at the high-level state. The transistor M6 is therefore turned on and the transistor M5 is turned on, so that the third signal S3 is at the low-level state and the switch unit 700 is therefore turned off. So, the output of the flip-flop circuit 702 can be determined by the trigger signal or the stop signal, and the turn-on or turn-off state of the switch unit 230b can be determined as well.

Figure 9:
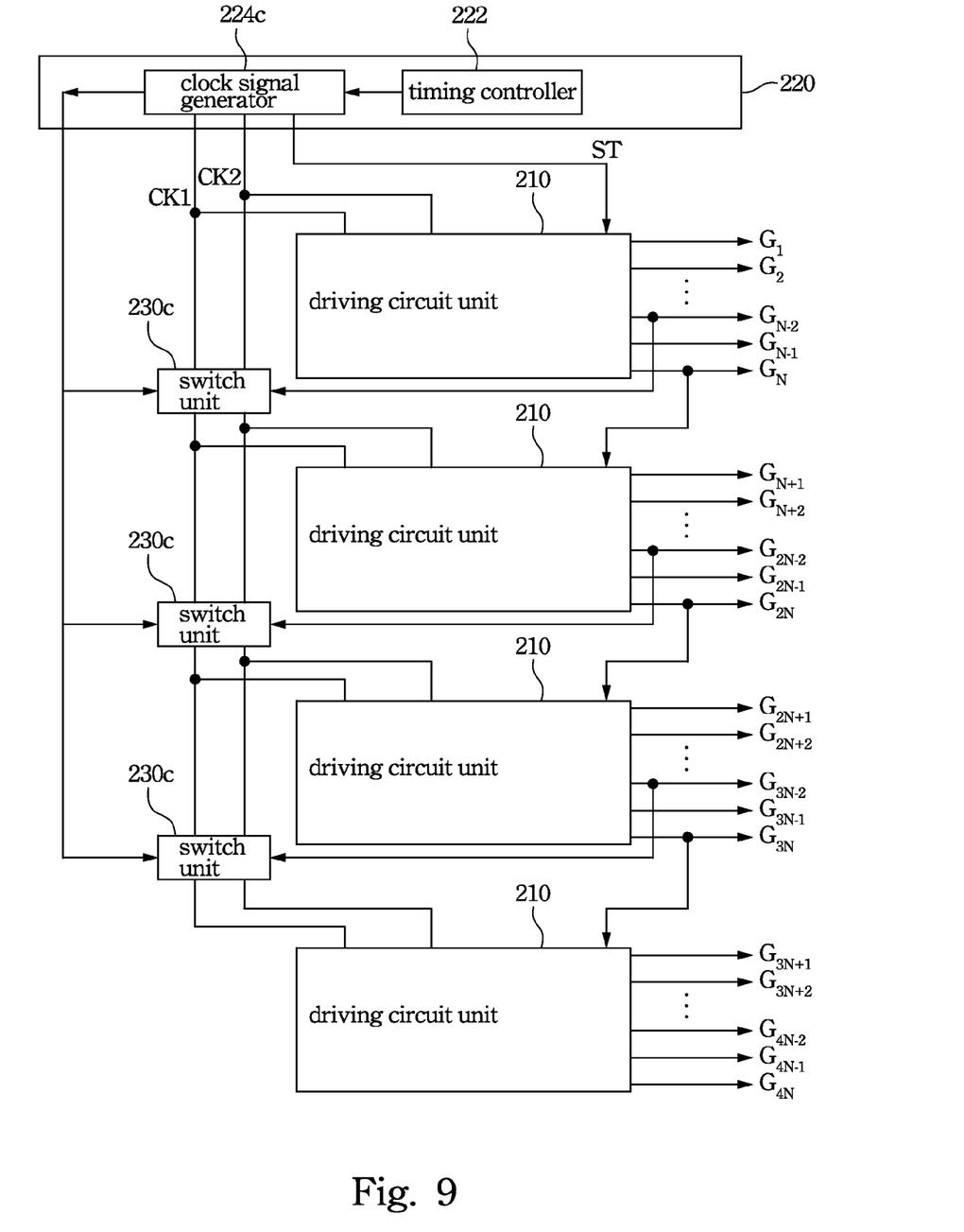
FIG. 9 shows a gate driving circuit according to the fourth embodiment of the present invention.

FIG. 9 shows a gate driving circuit according to the fourth embodiment of the present invention. Comparing FIG. 9 and FIG. 6, the clock signal generator 224c transmits a stop signal to each of the switch units 230c to turn off the switch units 230c to block the clock signals CK1 and CK2 after the last driving circuit unit 210 outputs the last driving signal $G_{4N}$. Further, the clock signal generator 224c can also stop transmitting the clock signals CK1 and CK2 after the last driving circuit unit 210 outputs the last driving signal $G_{4N}$.

Figure 10:
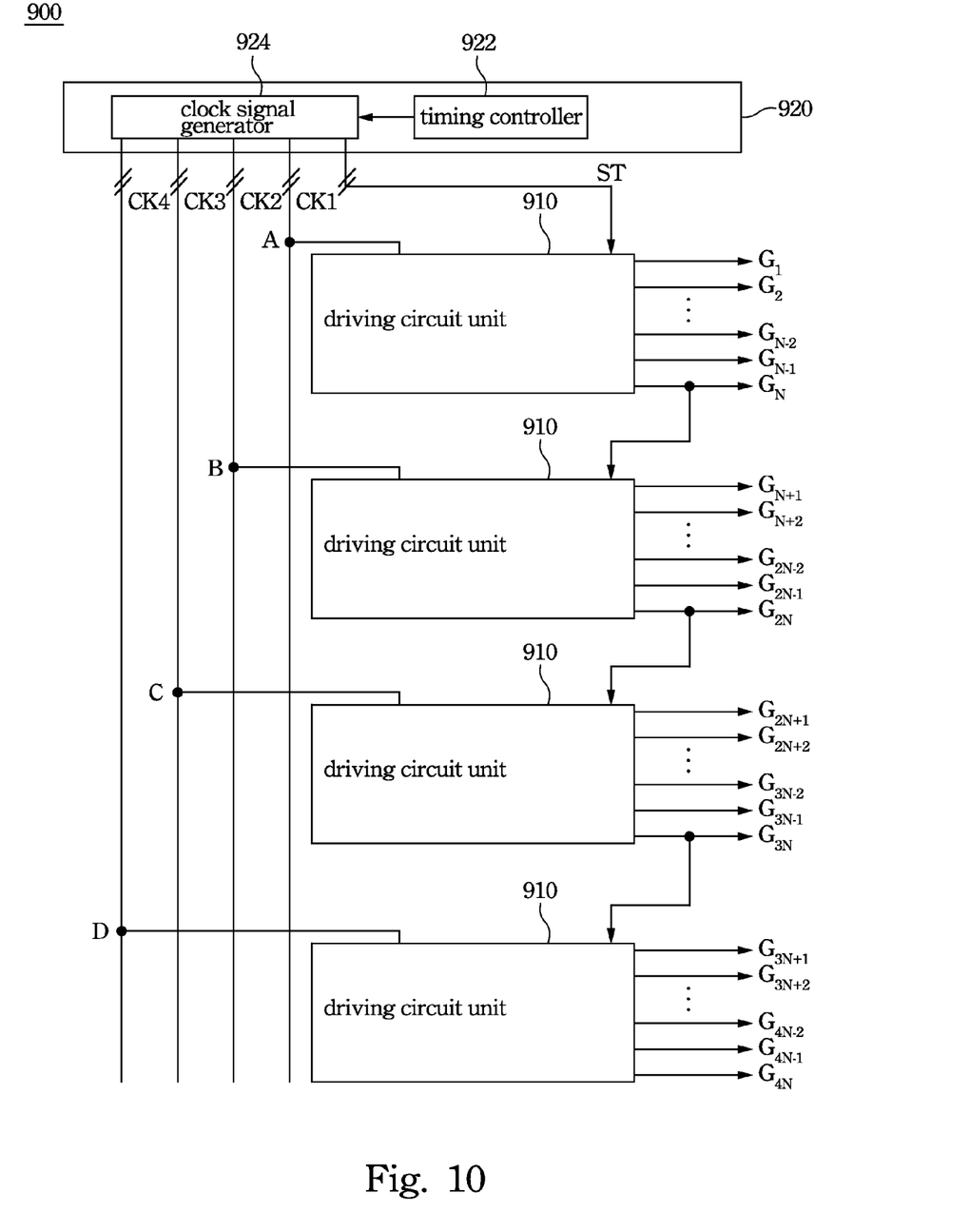
FIG. 10 shows a gate driving circuit according to the fifth embodiment of the present invention.

FIG. 10 shows a gate driving circuit according to the fifth embodiment of the present invention. The gate driving circuit 900 includes driving circuit units 910 and a clock signal output unit 920. Four driving circuit units 910 are similarly taken for example herein in order to be easily described, and each of the driving circuit units 910 is similarly assumed to output N driving signals.

In the gate driving circuit 900, each of the driving circuit units 910 includes N driving signal output circuit (not shown) for outputting N driving signals, and each of the driving signals is sequentially transmitted to a corresponding scan line. Besides, the clock signal output unit 920 transmits clock signals CK1, CK2, CK3 and CK4 respectively to the corresponding driving circuit units 910 to sequentially control the driving circuit units 910, and the clock signal output unit 920 transmits only one of the clock signals to one of the corresponding driving circuit units 910 at a time.

Further, the clock signal output unit 920 can also include a timing controller 922 and a clock signal generator 924. The timing controller 922 generates a reference clock signal. The clock signal generator 924 receives the reference clock signal and outputs the clock signals CK1, CK2, CK3 and CK4 according to the reference clock signal.

An operation of the gate driving circuit 900 is described as following with an embodiment. First of all, the clock signal generator 924 outputs only the clock signal CK1 to control the first driving circuit unit 910. Then, when the clock signal generator 924 transmits a start signal ST to the first driving circuit unit 910, the first driving circuit unit 910 is triggered and sequentially outputs the driving signals $G_1 \ldots G_N$ to the scan lines, and transmits the last driving signal $G_N$ to the second driving circuit unit 910, so as to trigger the second driving circuit unit 910.

At this time, the clock signal generator 924 is turned into outputting only the clock signal CK2, so as to control the second driving circuit unit 910. After the second driving circuit unit 910 is triggered, the second driving circuit unit 910 sequentially outputs the driving signals $G_{N+1} \ldots G_{2N}$ to the scan lines and outputs the last driving signal $G_{2N}$ to the third driving circuit unit 910, so as to control the third driving circuit unit 910. The third and fourth driving circuit unit 910 sequentially output the driving signals $G_{2N+1} \ldots G_{3N}$ and the driving signals $G_{3N+1} \ldots G_{4N}$, respectively, in the same way.

Figure 11:
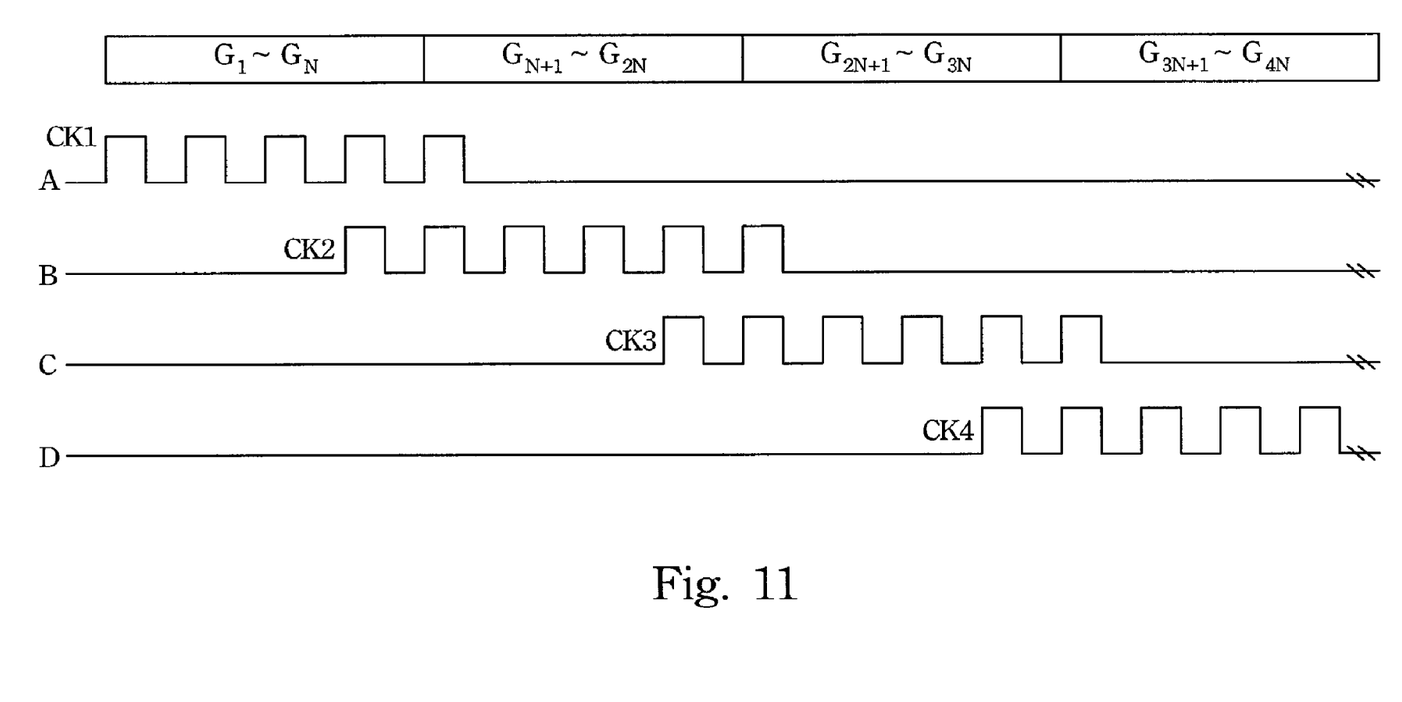
FIG. 11 is another clock diagram showing the transmission condition of the clock signals.

FIG. 11 is another clock diagram showing the transmission condition of the clock signals. Referring to FIG. 10 and FIG. 11, first of all, the clock signal generator 924 outputs only the clock signal CK1 to the first driving circuit unit 910 through the node A. Then, after the first driving circuit unit 910 outputs the driving signals, the clock signal generator 924 is turned into outputting only the clock signal CK2 to the second driving circuit unit 910 through the node B. Therefore, the clock signal generator 924 sequentially outputs the corresponding clock signals to the driving circuit units 910 in the way as mentioned.

Furthermore, in order to reduce the response time of the gate driving circuit, that is, to increase the speed of the displayed images on the liquid crystal display, the gate driving circuit according to the embodiments of the present invention can be fabricated on a glass substrate, so as to increase the response speed.

Therefore, according to the embodiments of the present invention, the gate driving circuit can be provided to reduce the unnecessary current losses to save the desired power.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A gate driving circuit, comprising:
    a plurality of driving circuit units, wherein each of the driving circuit units sequentially outputs a plurality of driving signals to a plurality of scan lines; and
    a plurality of switch units respectively disposed between two adjacent driving circuit units and conducting or blocking a first clock signal and a second clock signal;
    wherein each of the switch units is turned on by receiving one of the driving signals outputted from a previous driving circuit unit and transmits the first clock signal and the second clock signal to a next adjacent one of the switch units and to a next one of the driving circuit units when being turned on.

2. The gate driving circuit of claim 1, further comprising:
    a clock signal output unit for transmitting the first clock signal and the second clock signal to the driving circuit units.

3. The gate driving circuit of claim 2, wherein the clock signal output unit further comprises:
    a timing controller generating a reference clock signal; and
    a clock signal generator receiving the reference clock signal and generating the first clock signal and the second clock signal according to the reference clock signal.

4. The gate driving circuit of claim 2, wherein the clock signal output unit transmits a start signal to a first driving circuit unit of the driving circuit units to trigger the first driving circuit unit.

5. The gate driving circuit of claim 2, wherein a last driving circuit unit of the driving circuit units transmits one of the driving signals to the clock signal output unit to stop the clock signal output unit transmitting the first clock signal and the second clock signal.

6. The gate driving circuit of claim 2, wherein the clock signal output unit transmits a stop signal to each of the switch units to turn off the switch units after a last driving circuit unit of the driving circuit units outputs a last driving signal.

7. The gate driving circuit of claim 2, wherein the clock signal output unit stops transmitting the first clock signal and the second clock signal after a last driving circuit unit of the driving circuit units outputs a last driving signal.

8. The gate driving circuit of claim 1, wherein a last driving circuit unit of the driving circuit units transmits one of the driving signals to the switch units to turn off the switch units.

9. The gate driving circuit of claim 1, further comprising:
    a plurality of compensation circuits each respectively disposed before one of the driving circuit units for compensating the first clock signal and the second clock signal and respectively transmitting the compensated first and second clock signals to one of the driving circuit units.

10. The gate driving circuit of claim 1, wherein the gate driving circuit is fabricated on a glass substrate.

11. A gate driving circuit of a liquid crystal display, comprising:
    a plurality of driving circuit units for outputting sequential driving signals, wherein each of the driving circuit units sequentially outputs a plurality of driving signals of the sequential driving signals to corresponding scan lines of the liquid crystal display;
    a timing controller generating a reference clock signal;
    a clock signal generator receiving the reference clock signal and outputting a first clock signal and a second clock signal to the driving circuit units according to the reference clock signal; and
    a plurality of switch units disposed outside the driving circuit units between two adjacent driving circuit units for conducting or blocking the first clock signal and the second clock signal outputted from the clock signal generator;
    wherein each of the switch units is turned on by one of the driving signals outputted from a previous one of the driving circuit unit to transmit the first clock signal and the second clock signal to a next adjacent one of the switch units and to a next one of the driving circuit units.

12. The gate driving circuit of claim 11, wherein the clock signal generator transmits a start signal to a first driving circuit unit of the driving circuit units to drive the first driving circuit unit.

13. The gate driving circuit of claim 11, wherein a last driving circuit unit of the driving circuit units transmits one of the driving signals to the clock signal generator to stop the clock signal generator transmitting the first clock signal and the second clock signal.

14. The gate driving circuit of claim 11, wherein a last driving circuit unit of the driving circuit units transmits one of the driving signals to the switch units to turn off the switch units.

15. The gate driving circuit of claim 11, wherein the clock signal generator transmits a stop signal to each of the switch units to turn off the switch units after a last driving circuit unit of the driving circuit units outputs a last driving signal.

16. The gate driving circuit of claim 11, wherein the clock signal generator stops transmitting the first clock signal and the second clock signal after a last driving circuit unit of the driving circuit units outputs a last driving signal.

17. The gate driving circuit of claim 11, further comprising:
    a plurality of compensation circuits each respectively disposed before one of the driving circuit units for compensating the first clock signal and the second clock signal and respectively transmitting the compensated first and second clock signals to one of the driving circuit units.

18. The gate driving circuit of claim 11, wherein the timing controller and the clock signal generator are disposed on a print circuit board assembly or a substrate.

19. The gate driving circuit of claim 11, wherein the gate driving circuit is fabricated on a glass substrate.

20. A gate driving circuit, comprising:
    a plurality of driving circuit units comprising a first driving circuit unit, a second driving circuit unit and a third driving circuit unit, wherein each of the driving circuit units sequentially outputs a plurality of driving signals to a plurality of scan lines; and
    a plurality of switch units disposed outside the driving circuit units, each of the switch units being configured for conducting or blocking both a first clock signal and a second clock signal, the switch units comprising a first switch unit, a second switch unit and a third switch unit;

wherein the first driving circuit unit and the second driving circuit unit are adjacent to each other and configured for outputting sequential driving signals, and the first switch unit is disposed between the first driving circuit unit and the second driving circuit unit, and the second driving circuit unit and the third driving circuit unit are adjacent to each other and configured for outputting sequential driving signals, and the second switch unit is disposed between the second driving circuit unit and the third driving circuit unit.

21. The gate driving circuit of claim 20, wherein the first switch unit is turned on by one of the driving signals outputted from the first driving circuit unit, and both the first clock signal and the second clock signal pass and are transmitted through the first switch unit to the second driving circuit unit.

22. The gate driving circuit of claim 21, wherein the first switch unit is turned on by one of the driving signals outputted from the first driving circuit unit and the second switch unit is turned on by one of the driving signals outputted from the second driving circuit unit, and both the first clock signal and the second clock signal pass and are transmitted through the first switch unit and the second switch unit to the third driving circuit unit.

* * * * *